(12) United States Patent
Eiserer

(10) Patent No.: US 10,694,672 B2
(45) Date of Patent: Jun. 30, 2020

(54) MULTI-USE TOOL WITH INTERCHANGEABLE ATTACHMENTS

(71) Applicant: Rex A. Eiserer, Austin, TX (US)

(72) Inventor: Rex A. Eiserer, Austin, TX (US)

(*) Notice: Subject to any disclaimer, the term of this patent is extended or adjusted under 35 U.S.C. 154(b) by 48 days.

(21) Appl. No.: 15/901,030

(22) Filed: Feb. 21, 2018

(65) Prior Publication Data
US 2018/0235147 A1  Aug. 23, 2018

Related U.S. Application Data

(60) Provisional application No. 62/462,649, filed on Feb. 23, 2017.

(51) Int. Cl.
| | |
|---|---|
| *A01D 42/00* | (2006.01) |
| *A01D 34/416* | (2006.01) |
| *A01D 34/84* | (2006.01) |
| *A01B 1/06* | (2006.01) |
| *A01D 34/73* | (2006.01) |
| *A01D 42/04* | (2006.01) |
| *A01D 42/06* | (2006.01) |
| *A01G 20/47* | (2018.01) |

(52) U.S. Cl.
CPC .............. *A01D 42/00* (2013.01); *A01B 1/065* (2013.01); *A01D 34/416* (2013.01); *A01D 34/4165* (2013.01); *A01D 34/4168* (2013.01); *A01D 34/733* (2013.01); *A01D 34/84* (2013.01); *A01D 42/04* (2013.01); *A01D 42/06* (2013.01); *A01G 20/47* (2018.02)

(58) Field of Classification Search
CPC ........ A01D 42/00; A01D 42/04; A01D 42/06; A01D 34/416; A01D 34/4165; A01D 34/4168; A01D 34/733; A01D 34/84; A01B 1/065; A01G 20/47
See application file for complete search history.

(56) References Cited

U.S. PATENT DOCUMENTS

| | | | | |
|---|---|---|---|---|
| 2,553,463 A | * | 5/1951 | McCulloch | A01D 34/001 172/41 |
| 2,817,205 A | * | 12/1957 | Muller | A01B 1/065 172/41 |
| 3,017,733 A | * | 1/1962 | Evans | A01D 34/84 172/41 |
| 4,104,796 A | * | 8/1978 | Sheldon | A01D 34/4162 30/276 |

(Continued)

*Primary Examiner* — Jamie L McGowan
(74) *Attorney, Agent, or Firm* — Sprinkle IP Law Group

(57) ABSTRACT

Systems and methods for using interchangeable tool attachments in multi-use tools. In one embodiment, a multi-use tool includes a motor, a shaft and a shaft adapter at the end of the shaft. The motor has user controls (e.g., on/off switch or throttle) that control the motor to drive the shaft and cause it to rotate. The shaft may include a rigid tubular outer member with a flexible inner shaft. The shaft adapter is coupled to the end of the rotating portion of the shaft. The shaft adapter has a mounting flange that rotates with the adapter at the end of the shaft. An interchangeable tool attachment is secured to the mounting flange, and rotation of the shaft adapter and mounting flange causes the tool attachment to rotate as well. Many different tool attachments can be interchangeably secured to the mounting flange to provide corresponding, different functions to the tool.

15 Claims, 5 Drawing Sheets

(56) References Cited

U.S. PATENT DOCUMENTS

| | | | | |
|---|---|---|---|---|
| 4,122,902 A | * | 10/1978 | Alexander | A01B 1/065 172/41 |
| 4,148,141 A | * | 4/1979 | Hoff | A01D 34/416 30/276 |
| 4,179,805 A | * | 12/1979 | Yamada | B27B 17/0008 172/41 |
| 4,188,719 A | * | 2/1980 | Hoff | A01D 34/416 30/122 |
| 4,226,021 A | * | 10/1980 | Hoff | A01D 34/90 30/276 |
| 4,329,834 A | * | 5/1982 | Hetrick | A01D 34/73 56/295 |
| 4,335,585 A | * | 6/1982 | Hoff | A01D 34/416 30/276 |
| 4,451,983 A | * | 6/1984 | Johnson | F16C 1/06 30/276 |
| 4,641,431 A | * | 2/1987 | Leming | A01G 3/0535 30/276 |
| 4,780,002 A | * | 10/1988 | Krause | A01D 34/416 384/279 |
| 5,048,278 A | * | 9/1991 | Jones | A01D 34/4166 30/276 |
| 5,414,934 A | * | 5/1995 | Schlessmann | A01D 34/902 30/275.4 |
| 5,810,093 A | * | 9/1998 | Howard | A01B 1/065 172/111 |
| 6,006,434 A | * | 12/1999 | Templeton | A01D 34/90 30/276 |
| 6,247,539 B1 | * | 6/2001 | Jerez | A01B 1/065 172/123 |
| 6,415,585 B2 | * | 7/2002 | Morabit | A01D 34/416 30/276 |
| 6,880,251 B2 | * | 4/2005 | Gambert | A01D 34/902 30/276 |
| 6,955,227 B1 | * | 10/2005 | Motosko | A01B 1/065 172/111 |
| 7,360,312 B2 | * | 4/2008 | Warashina | A01D 34/90 30/276 |
| 7,382,104 B2 | * | 6/2008 | Jacobson | A01D 34/902 15/330 |
| 7,451,832 B1 | * | 11/2008 | Delvo | A01B 33/106 172/25 |
| 7,966,736 B2 | * | 6/2011 | Arnetoli | A01D 34/4163 30/276 |
| 8,176,989 B1 | * | 5/2012 | Ponomarenko | A01D 43/16 172/17 |
| 8,651,196 B2 | * | 2/2014 | Sedmak | A01B 1/065 172/371 |
| 2002/0153146 A1 | * | 10/2002 | Dueitt | A01B 1/065 172/25 |
| 2004/0148784 A1 | * | 8/2004 | Grace | A01D 34/4163 30/276 |
| 2008/0250570 A1 | * | 10/2008 | Dayton | B25F 3/00 7/170 |
| 2008/0271424 A1 | * | 11/2008 | Alliss | A01D 34/4166 56/12.7 |
| 2016/0227694 A1 | * | 8/2016 | Bermudez | A01G 3/086 |

* cited by examiner

MULTI-USE TOOL WITH INTERCHANGEABLE ATTACHMENTS

CROSS-REFERENCE TO RELATED APPLICATIONS

This application claims the benefit of U.S. Provisional Patent Application 62/462,649, filed Feb. 23, 2017 by Rex A. Eiserer, which is incorporated by reference as if set forth herein in its entirety.

BACKGROUND

Field of the Invention

The invention relates generally to tools and more particularly to systems and methods for providing multi-use tools in which interchangeable tool attachments can be secured to a rotating shaft adapter of a base tool that is similar to a string trimmer.

Related Art

Conventional string trimmers are systems simply composed of a motor, a shaft, a hub or drum, and a cutting media generally composed of strings. The motor is attached to a shaft at one end and spins the hub/drum mounted at the other end of the shaft. Strings attached to the hub/drum are spun at high speed in order to cut or trim grass and weeds. Descriptions of prior art string trimmers can be found, for example, in U.S. Pat. Nos. 5,901,448 and 6,944,956.

Most string trimmers use one or two strings but some models use three or more strings as more strings infer more cutting capability. During the cutting process, the strings tend to wear down and/or break and require replacement. Replacing the strings is done by two means. The first means is completely stopping the hub/drum and replacing the entire string(s) with new ones. These new strings are sections of strings that are already cut to a specified length and are held in place by various means. This method requires a replacement every time a string breaks or wears down and is time consuming to replace. The second method of replacement is by unwinding a single long string from the hub, which forms a drum or spool on which the string is wound. The unwinding can be done manually when the drum is stopped or automatically though the "bump" method which allows the drum to unwind a predetermined amount of string during operation. Either way, the drum must be pre-wound with string prior to using the string trimmer which is time consuming and frustrating.

SUMMARY OF THE INVENTION

This disclosure is directed to multi-use tools that solve one or more of the problems discussed above. One embodiment comprises a multi-use tool that includes a motor, a shaft and a shaft adapter at the end of the shaft. The shaft is coupled to the motor so that the motor drives the shaft and causes it to rotate. The motor of the tool is controlled by user controls (e.g., on/off switch or throttle) that may be positioned by a handle near the upper end of the tool. In one embodiment, the shaft includes a rigid tubular outer member with a flexible inner shaft that rotates within the tubular outer member. The shaft adapter is coupled to the end of the rotating portion of the shaft. The shaft adapter has a mounting flange that rotates with the adapter at the end of the shaft. An interchangeable tool attachment is secured to the mounting flange, and rotation of the shaft adapter and mounting flange causes the tool attachment to rotate as well. Many different tool attachments can be interchangeably secured to the mounting flange to provide corresponding, different functions to the tool. For example, a disk-shaped cutting web may be secured to the mounting flange so that the tool can be used to trim grass or weeds in the same manner as a conventional string trimmer. The cutting web attachment can be removed and replaced with another type of disk-shaped blade to allow the tool to be used to cut heavier weeds or brush. Other attachments may include fan blades, weeders, tillers, and the like.

The shaft adapter may be coupled to the shaft in various ways. For instance, in one embodiment, the lower end of the shaft is threaded, and the shaft adapter is secured to the shaft by threading the shaft adapter itself onto the lower end of the shaft. Alternatively, the threaded end of the shaft may extend through the shaft adapter, and a nut may be threaded onto the shaft to secure the adapter to the end of the shaft. In yet another alternative embodiment, the shaft adapter may be secured to a hub or drum which is itself secured to the lower end of the shaft. In this embodiment, the shaft adapter may be secured to the existing hub using screws, or it may be "snapped" into place. The mounting flange of the shaft adapter has a connector that allows interchangeable tool attachments to be secured to the flange. The connector may have different configurations. In one embodiment, the mounting flange provides a flat surface which is perpendicular to the shaft's axis of rotation, and a spindle that extends outward from the flat surface parallel to the axis of rotation. The interchangeable tool attachment is positioned over the spindle against the flat surface of the mounting flange. The interchangeable tool attachment and the mounting flange may have mating keys and keyways which prevent rotation of the tool attachment with respect to the mounting flange. When the tool attachment has been properly positioned on the mounting flange, a threaded cap is screwed onto the spindle (which is also threaded) to secure the attachment.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
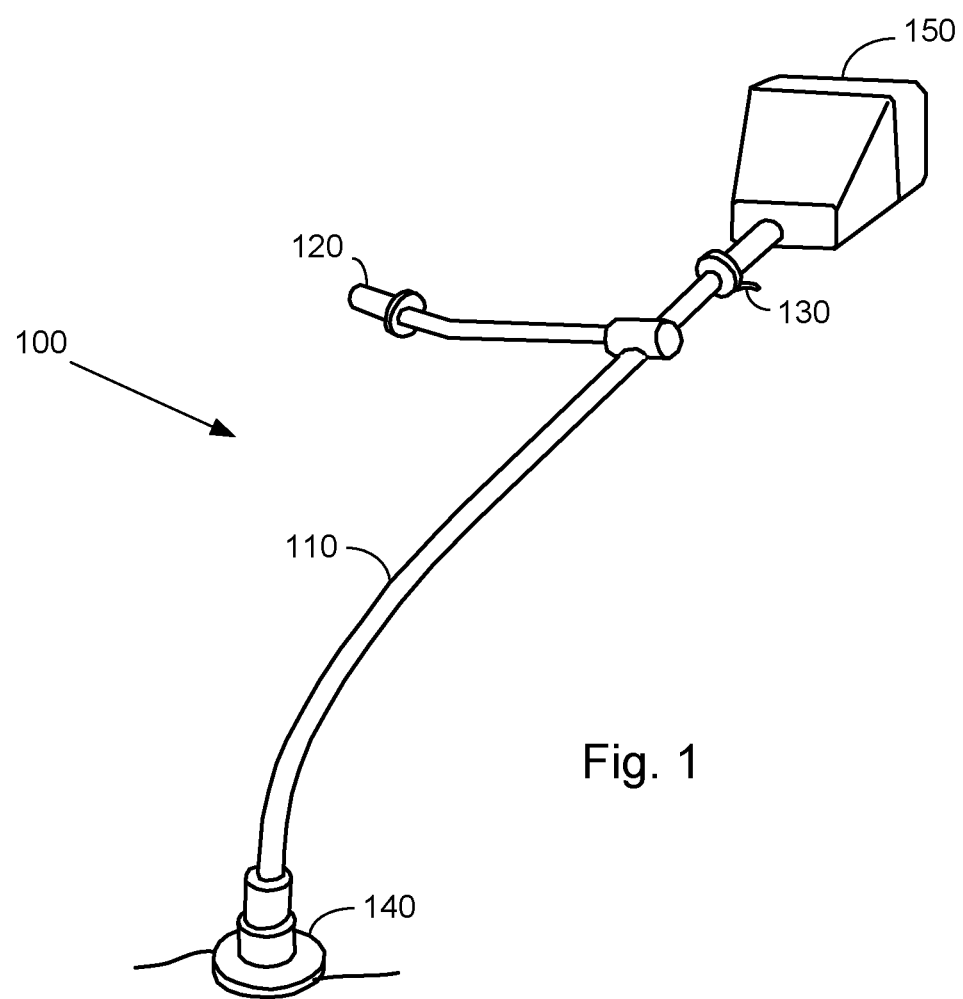
FIG. 1 is a diagram illustrating a string-trimmer-type tool in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

This disclosure is directed to systems and methods that solve one or more of the problems discussed above. In one particular embodiment (see FIG. 1), a tool 100 has a shaft 110 with a handle 120 and operator controls 130 at a first end and a powered rotating shaft adapter 140 at the second end. A string trimmer attachment or various other interchangeable attachments can be secured to the adapter.

Shaft 110 has a rigid tubular outer shaft with a flexible inner shaft that extends from the motor 150 to the shaft adapter 140. The inner shaft rotates within the outer shaft so that the motor can drive the shaft adapter. Shaft 110 thereby forms an extension member that allows the cutting attachment (or other attachment) to be positioned near the ground, while the motor and user controls are more conveniently positioned at the level of the user's hand/arm. While the shaft adapter is driven by a motor at the upper end of the shaft in this embodiment, alternative embodiments may have a motor positioned at the lower end of the shaft. For example, an electric motor may be positioned at the lower end of the shaft while still allowing the user to operate the motor using controls and a power source at the upper end of the shaft. The shaft adapter has a universal mounting flange that is designed to allow any of several attachments to be secured to the shaft adapter so that they are driven by rotation of the shaft adapter. One attachment is a trimmer attachment that is similar to the head of a string trimmer. The shaft adapter's mounting flange is specially designed to allow the use of interchangeable attachments, such as a string trimmer head.

Figure 2A:
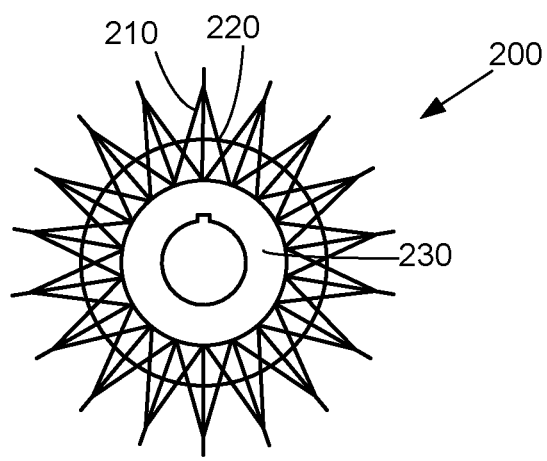
FIGS. 2A-2C are diagrams illustrating a web cutter attachment for a multi-use tool in accordance with one embodiment.
Figure 2B:
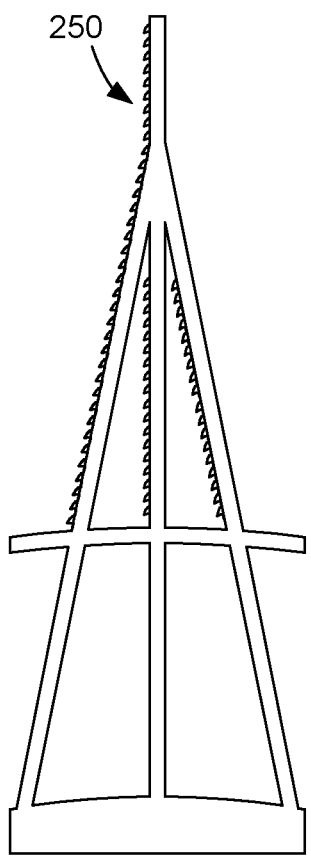
Figure 2C:
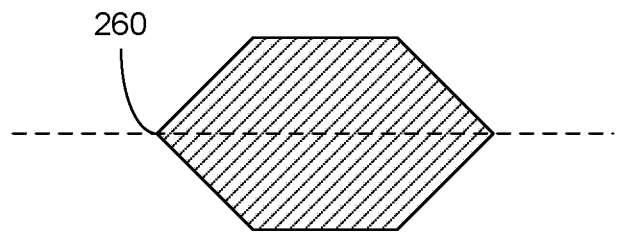

One attachment uses a novel cutting media that cuts more effectively than a typical string trimmer head and allows the cutting media to be replaced more quickly and easily than a typical string trimmer head. The cutting media in this embodiment can be described as a web of strings that is attached to and detached from the mounting flange of the shaft adapter as a single unit. The strings may be plastic, metal (wire) or any other suitable material. An example of a cutting web 200 is illustrated in FIGS. 2A-2C. FIG. 2A shows the overall structure of the cutting web in one embodiment. FIG. 2B shows the structure of a portion of the cutting web in more detail. FIG. 2C shows the cross-sectional structure of an individual string of the cutting web.

The web can be simply 'snapped' onto the mounting flange or held in place by a cap or other similar mechanism. In the embodiment of FIG. 2A, multiple strings (e.g., 210) are connected to a center portion (230) that is attached to the mounting flange of the shaft adapter. These strings extend outward from the center portion in a generally radial direction (away from the axis around which the adapter rotates) to form the generally disk-shaped web. The strings intersect with each other and are joined at several points or junctions (e.g., 220) so that they hold each other in place as the web rotates. The portions of the strings at the outer periphery of the web perform the cutting. As this web wears down and the strings at the periphery break, some of the junctions near the periphery also break, so that portions of the strings that are then at the periphery of the web are freed from each other and begin to perform the cutting function. When the web is worn down enough that the inner strings can no longer effectively cut, the worn web is simply replaced with a new web.

In one embodiment, center portion 230 may slide over a spindle portion of the mounting flange and may be held in place by a cap that is placed over the center portion and secured to the spindle. Additionally, there could be anti-slip features such a dowels, pins, keyways, etc. built into the mounting flange and disk to keep the disk from rotating on the mounting flange during use. While this embodiment uses a screw cap to secure the disk on the mounting flange, there are numerous other ways to secure the desk to the mounting flange including snapping it on, securing it with screws/bolts, or other means. Additional features include mechanisms to prevent the securing mechanism from backing off and letting the disk slip off.

Referring to FIG. 2B, one "arm" of the cutting web is shown in more detail. In this embodiment, one or more edges of the strings are serrated. The serrations or teeth may have various forms. As depicted in the figure, the teeth are slightly hooked inward (toward the center of the cutting web) like those of a saw blade so that they effectively tear through the grass or other materials being cut by the web, rather than simply hitting and breaking them. The teeth may be formed on all or only portion of the strings, and may be formed on one side (as shown in the figure) or both sides (so that they can cut when the web is rotated in either direction). If the teeth or other cutting edges are formed on both sides of the strings, the side of the strings used for cutting can be switched by simply turning the cutting web over and mounting it in the opposite direction. Referring to FIG. 2C, the individual strings of the cutting web may be formed so that the cross-section has sharp corners (e.g., 260) on their leading edges (the direction of travel of the strings is indicated by the dashed line). The sharp corners help the strings to cut through the grass or other materials rather than simply breaking them.

Figure 3A:
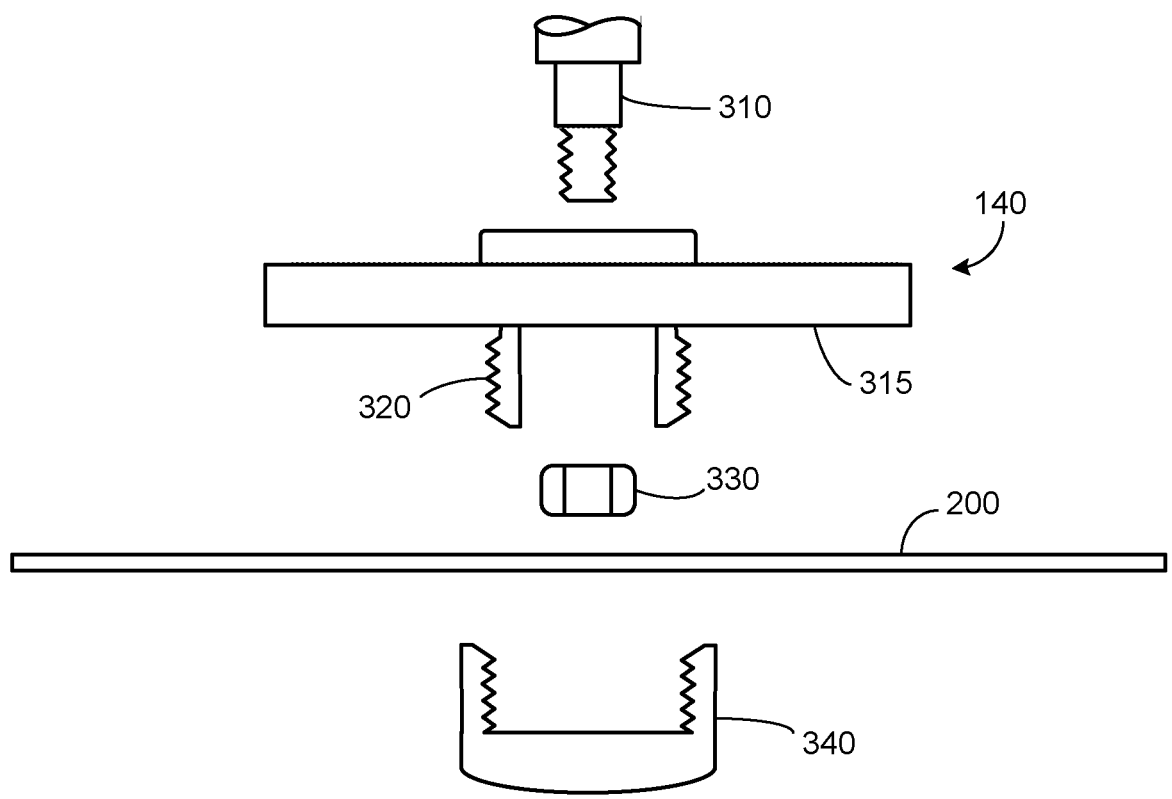
FIGS. 3A-3C are diagrams illustrating the shaft adapter of a multi-use tool in accordance with several embodiments.
Figure 3B:
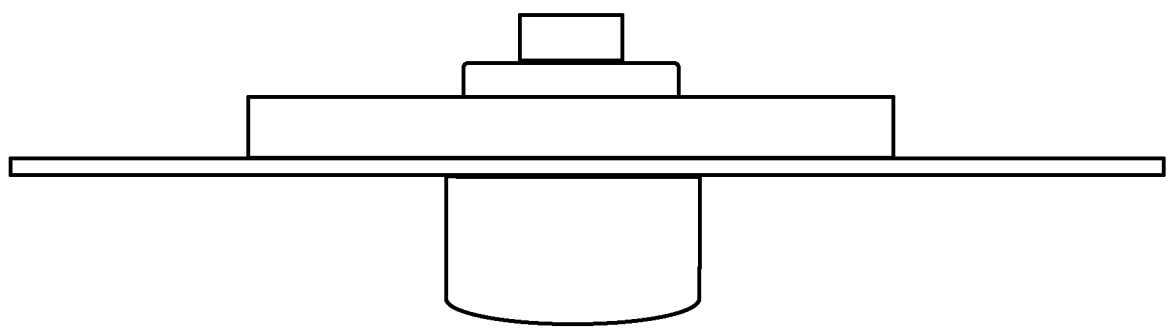

The attachment mechanism used in one embodiment to secure the cutting web to the shaft adapter is illustrated in FIGS. 3A and 3B. FIG. 3A shows the components in a disassembled state, while FIG. 3B shows the components when they are assembled. As depicted in this figure, shaft adapter 140 is attached to the end of a shaft 310 of the tool, and is secured by a nut 330. In one embodiment, shaft adapter 140 may be retrofitted onto a trimmer by attaching this adapter to the original head of the trimmer (which holds the drum around which the trimming string is wound). Shaft 310 is coupled to the tool's motor, which drives the rotary motion of the shaft. Shaft adapter 140 has a mounting flange 315 and a spindle 320 that extends downward, away from the shaft end. Cutting web 200 is positioned over the spindle, against the flat body of mounting flange 315, and a retainer cap 340 is screwed onto (or otherwise secured to) the spindle to hold the cutting web in position on the shaft adapter.

Figure 3C:
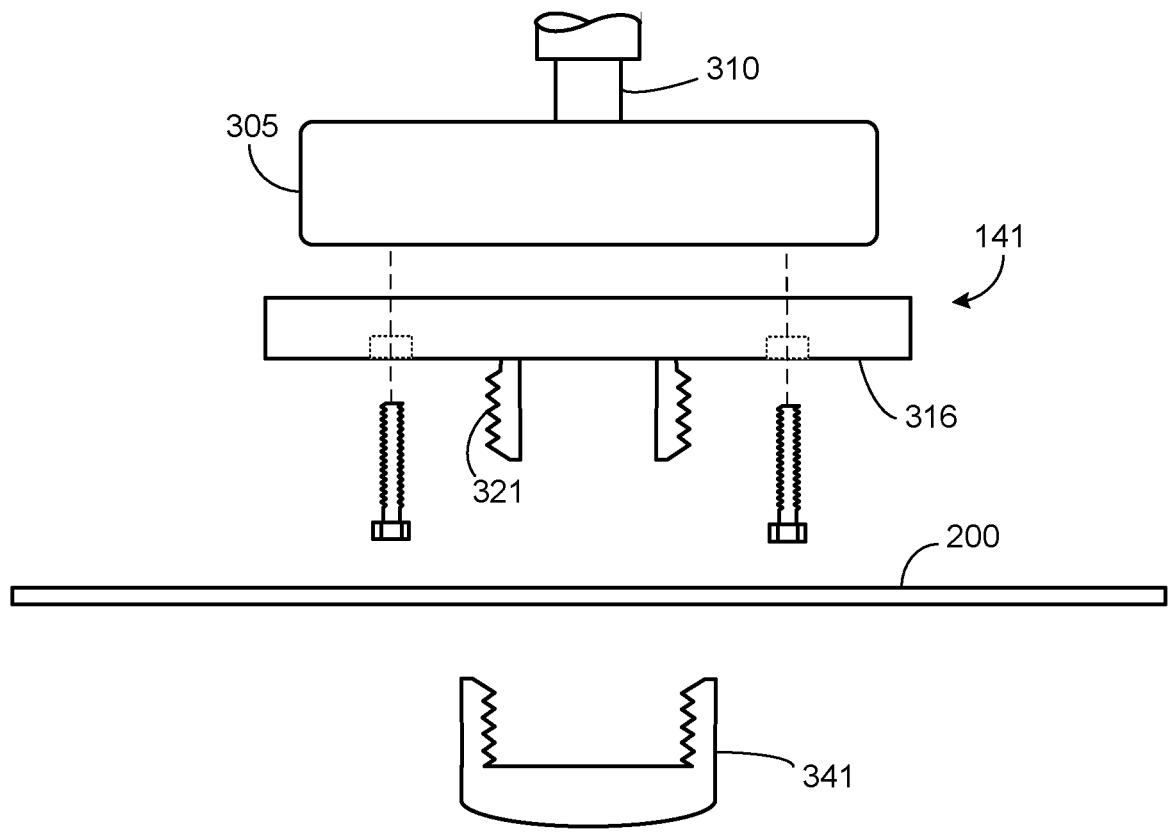

Referring to FIG. 3C, the structure of a shaft adapter in an alternative embodiment is shown. In this embodiment, shaft adapter 141 is configured to be attached to the hub/drum 305 of a string trimmer. Hub/drum 305 is secured to shaft 310, and is designed to hold cutting string (e.g., by winding the string onto the hub/drum). Rather than removing hub/drum 305, screws (e.g., 317) are used to secure shaft adapter 141 directly to the hub/drum. Otherwise, this embodiment is similar to the embodiment shown in FIGS. 3A and 3B, in that a spindle 321 extends downward from mounting flange 316, and a threaded cap 341 is threaded onto the spindle to secure attachment 200 to the mounting flange.

As noted above, the web may have several advantages over simple strings.

For instance, the web is easily replaced as a single unit—it can be snapped on or secured to the shaft adapter's mounting flange in various ways that are easier than winding string on a drum or inserting individual strings into a hub. Additionally, a cutting web provides many more cutting edges than conventional trimmers, which normally have one or two strings that serve as cutting edges. Further, as the cutting web wears down, additional cutting strings are generated when the disk wears down to the points at which the strings form junctions (as the junction wears through, the strings become free and act as individual cutters). Still further, the web is more easily seen in operation, which allows for a greater control of cutting. In other words, the greater number of strings form a more visible appearance of a disk, as compared to the single/dual strings of conventional trimmer heads which are nearly invisible, so that it is difficult to tell where the cutting edges of the strings end.

Since the cutting strings do not flex (due to the interconnections between the strings of the web), there is no line breakage from the string flexing during cutting operations. Consequently, it is not necessary to have a smooth curve on the shaft adapter for the string as in the prior art. Also, the interconnections between the strings of the web cause the strings to be held in a more outwardly extended position than strings in conventional trimmers (in which the strings extend outward more tangentially than radially outward), which may result in a greater cutting radius and corresponding higher speed at the ends of the strings. Since the strings of the web aren't wound around a drum, and since the strings do not rely on centrifugal force for bump and feed, the strings can be substantially thicker and thus more durable during cutting. The thicker strings are also more easily formed with specific cross-sectional shapes (e.g., they may have corners that produce a sharper cutting edge compared to round or smooth cross-sections), and the structure of the web will better maintain the orientation of the cutting edges (e.g., a sharper cutting edge will be held in a forward-facing direction). The cutting web can be made from any suitable method, such as injection molding the web, stamping or cutting the web from sheet materials, or weaving the web together from individual strings. The web can be made from any suitable material, such as plastic, metal sheet, metal cable/wires, or any combinations of materials.

Figure 4:
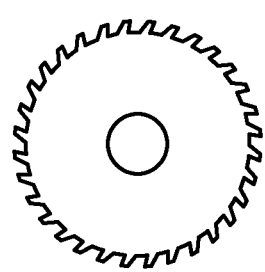
FIG. 4 is a diagram illustrating a sawtooth blade attachment for a multi-use tool in accordance with one embodiment.

As noted above, the cutting web is one of multiple attachments that can be mounted on the rotating shaft adapter of the tool (e.g., attached to the adapter's mounting flange). As an alternative to a web design, the cutting media can also have a solid body with teeth on the periphery, similar to a circular saw blade. This embodiment, depicted in FIG. 4, could be used to cut thicker stalks, brush, saplings, limbs, or twigs. This alternative would have a sawtooth-style blade, and can be made of various materials including, but not limited to plastics, metals, etc.

Figure 5:
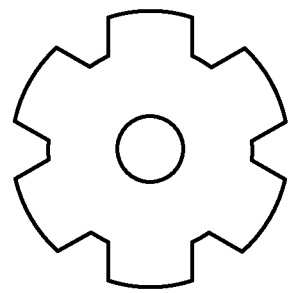
FIG. 5 is a diagram illustrating a straight bar type blade attachment for a multi-use tool in accordance with one embodiment.
Figure 6:
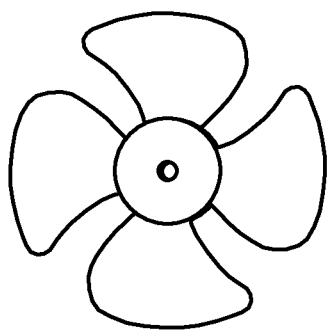
FIG. 6 is a diagram illustrating a fan blade attachment for a multi-use tool in accordance with one embodiment.

The tool could also use a straight bar style traditional blade as shown in FIG. 5, if needed. Another attachment is a fan blade as shown in FIG. 6. When this attachment is used, the tool acts like a lawn blower to blow leaves or clean off sidewalks and such after edging. The fan blade can be shrouded or plain.

Figure 7:
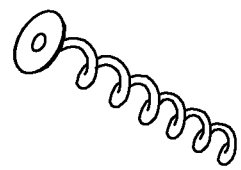
FIG. 7 is a diagram illustrating a weeder attachment for a multi-use tool in accordance with one embodiment.
Figure 8:
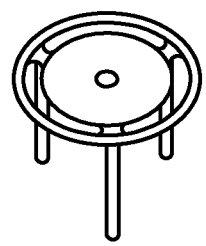
FIG. 8 is a diagram illustrating a tiller attachment for a multi-use tool in accordance with one embodiment.

Another embodiment is a helical weeder attachment that looks like a corkscrew. As shown in FIG. 7. The screw attachment would screw down into the weed center and, once it bottoms out (possibly against a stop such as a disk half way down), the screw would pull the weed out of the ground. When the attachment is pulled out of the ground, it is spinning, so the weed is "spun" out of the attachment. Yet another embodiment has one or more finger prongs that extend parallel to the axis of rotation of the shaft adapter and function like a tiller for soft dirt. This embodiment is depicted in FIG. 8. The tiller could be used to till the ground in flower beds or gardens.

It should be noted that, while the embodiments described above are directed to the use of interchangeable tool attachments with a hand-held string-trimmer-type tool, the interchangeable attachments may, in alternative embodiments, be coupled to other types of motorized tools. For instance, a cutting web attachment may be mounted on a walk-behind trimmer or mower, or any tool that has a motor-driven shaft with a shaft adapter that allows the cutting web to be mounted on the shaft.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. An apparatus comprising:
   a motor;
   an extension member coupled to the motor, the extension member having a rigid outer tubular member and an inner shaft positioned within the outer tubular member, wherein the motor drives the inner shaft and thereby causes the inner shaft to rotate within the outer tubular member, the inner shaft having a threaded end;
   a shaft adapter having a tool mounting flange, wherein the shaft adapter is configured to have any of a plurality of interchangeable tool attachments secured thereto, each of the interchangeable tool attachments providing a corresponding different tool function, wherein the shaft adapter is secured to the threaded end of the inner shaft, wherein rotation of the inner shaft causes the shaft adapter and tool mounting flange to rotate; and one of the plurality of interchangeable tool attachments removably secured against the tool mounting flange of the shaft adapter external to the outer tubular member, wherein rotation of the shaft adapter and the mounting flange causes the one of the plurality of interchangeable tool attachments to rotate and to provide the corresponding tool function.

2. The apparatus of claim 1, wherein the mounting flange includes a connector which is separate from the threaded end of the inner shaft which secures the one of the interchangeable tool attachments to the mounting flange.

3. The apparatus of claim 2, wherein the connector of the mounting flange comprises a spindle extending from the mounting flange, wherein the spindle extends into the one of the plurality of interchangeable tool attachments and wherein the one of the plurality of interchangeable tool attachments is secured on the spindle.

4. The apparatus of claim 3, wherein the spindle is threaded, and wherein a threaded cap is threaded onto the spindle over the one of the plurality of interchangeable tool attachments, thereby securing the one of the plurality of interchangeable tool attachments against the mounting flange on the spindle.

5. The apparatus of claim 1, one or more user controls coupled to the motor, wherein the user controls control operation of the motor according to control inputs received from a user.

6. The apparatus of claim 1, wherein the one of the plurality of interchangeable tool attachments and the mounting flange have mating keys and keyways which prevent rotation of the one of the plurality of interchangeable tool attachments with respect to the mounting flange.

7. The apparatus of claim 1, wherein the shaft adapter is secured to the inner shaft by threading the shaft adapter onto the threaded end of the inner shaft.

8. The apparatus of claim 1, wherein the one of the plurality of interchangeable tool attachments comprises a disk-shaped cutting tool.

9. The apparatus of claim 1, wherein the one of the plurality of interchangeable tool attachments comprises a fan blade.

10. The apparatus of claim 1, wherein the one of the plurality of interchangeable tool attachments comprises a helical weeder tool.

11. The apparatus of claim 1, wherein the one of the plurality of interchangeable tool attachments comprises a tiller having multiple prongs that extend parallel to the axis of rotation of the shaft adapter.

12. The apparatus of claim 1, wherein the one of the plurality of interchangeable tool attachments comprises a tool selected from the group comprising: a cutting web attachment; a sawtooth blade attachment; a straight bar blade attachment; a fan blade attachment; a weeder attachment; and a tiller attachment.

13. The apparatus of claim 1, wherein the first one of the plurality of interchangeable tool attachments comprises a tool selected from the group comprising: a cutting web attachment; a sawtooth blade attachment; a straight bar blade attachment; a fan blade attachment; a weeder attachment; and a tiller attachment.

14. An apparatus comprising:
a motor;
an extension member coupled to the motor, the extension member having a rigid outer tubular member and an inner shaft positioned within the outer tubular member, wherein the motor drives the inner shaft and thereby causes the inner shaft to rotate;
a hub which is secured to a lower end of the inner shaft, wherein the hub includes a drum which is external to the outer tubular member and is adapted to have cutting string wound thereon;
a tool adapter having a mounting flange, wherein the tool adapter is secured to an underside of the hub at the lower end of the shaft, wherein rotation of the shaft and hub causes the tool adapter and mounting flange to rotate; and
one of a plurality of interchangeable tool attachments removably secured against the mounting flange of the tool adapter, each of the interchangeable tool attachments providing a corresponding different tool function, wherein rotation of the tool adapter and the mounting flange causes the interchangeable tool attachment to rotate and to provide the corresponding tool function.

15. The apparatus of claim 14, wherein the one of the plurality of interchangeable tool attachments comprises a tool selected from the group comprising: a cutting web attachment; a sawtooth blade attachment; a straight bar blade attachment; a fan blade attachment; a weeder attachment; and a tiller attachment.

* * * * *